United States Patent
Abelli et al.

(10) Patent No.: US 11,014,282 B2
(45) Date of Patent: May 25, 2021

(54) APPARATUS AND PROCESS FOR ASEPTIC MOLDING OF A CONTAINER STARTING FROM A PARISON MADE OF A THERMOPLASTIC MATERIAL

(71) Applicant: GEA PROCOMAC S.P.A., Sala Baganza (IT)

(72) Inventors: Paolo Abelli, Parma (IT); Fabio Callegari, Salsomaggiore Terme (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 74 days.

(21) Appl. No.: 16/467,796

(22) PCT Filed: Nov. 30, 2018

(86) PCT No.: PCT/IB2018/059508
§ 371 (c)(1),
(2) Date: Jun. 7, 2019

(87) PCT Pub. No.: WO2019/145766
PCT Pub. Date: Aug. 1, 2019

(65) Prior Publication Data
US 2020/0338803 A1     Oct. 29, 2020

(30) Foreign Application Priority Data
Jan. 23, 2018   (IT) .................. 102018000001700

(51) Int. Cl.
*B29C 49/46*     (2006.01)
*B29C 49/36*     (2006.01)
(Continued)

(52) U.S. Cl.
CPC .............. *B29C 49/46* (2013.01); *B29C 49/36* (2013.01); *B29C 49/56* (2013.01);
(Continued)

(58) Field of Classification Search
None
See application file for complete search history.

(56) References Cited

U.S. PATENT DOCUMENTS 4,208,852 A  *  6/1980  Pioch .................... B29C 49/46
                                                    141/243
6,099,286 A      8/2000  Nitsche
                         (Continued)

FOREIGN PATENT DOCUMENTS

EP      2246176      11/2010
EP      2495090       9/2012
                (Continued)

*Primary Examiner* — Monica A Huson
(74) *Attorney, Agent, or Firm* — Pearne & Gordon LLP

(57) ABSTRACT

An aseptic molding process of a container starting from a parison (20) made of a thermoplastic material, comprising steps of:
blowing a first fluid into the parison (20) located in a mould (10);
introducing the first fluid into the compensating chamber (14) of the mould (10) through an inlet (15);
evacuating the first fluid from the molded container;
evacuating the first fluid from the compensating chamber (14) through an outlet (16) fashioned therein;
sterilising the compensating chamber (14) by supplying to the inlet (15) a second fluid containing a sterilising agent and evacuating the second fluid from the outlet (16) of the compensating chamber (14).

17 Claims, 5 Drawing Sheets

(51) Int. Cl.
  *B29C 49/56* (2006.01)
  *B29K 67/00* (2006.01)
  *B29L 31/00* (2006.01)

(52) U.S. Cl.
  CPC ........... *B29C 2049/4635* (2013.01); *B29C 2049/4694* (2013.01); *B29K 2067/003* (2013.01); *B29L 2031/7158* (2013.01)

(56) References Cited

U.S. PATENT DOCUMENTS

| | | | |
|---|---|---|---|
| 8,197,245 | B2 | 6/2012 | Dordoni |
| 8,696,339 | B2 | 4/2014 | Geltinger et al. |
| 9,044,888 | B2 | 6/2015 | Hoellriegl et al. |
| 9,096,011 | B2 | 8/2015 | Elbs |
| 9,186,856 | B2 | 11/2015 | Pagliarini et al. |
| 2004/0013762 | A1* | 1/2004 | Bianchini ............... B29C 49/56 425/522 |
| 2008/0020085 | A1* | 1/2008 | Bianchini ............... B29C 49/56 425/540 |
| 2009/0263535 | A1* | 10/2009 | Tonga .................... B29C 33/30 425/522 |
| 2010/0272844 | A1 | 10/2010 | Dordoni |
| 2012/0201918 | A1 | 8/2012 | Elbs |
| 2012/0223465 | A1 | 9/2012 | Voth et al. |
| 2012/0225156 | A1 | 9/2012 | Geltinger et al. |
| 2013/0043622 | A1 | 2/2013 | Hoellriegl et al. |
| 2014/0103584 | A1 | 4/2014 | Pagliarini et al. |
| 2015/0042002 | A1* | 2/2015 | Chomel .................. B29C 49/56 264/40.3 |

FOREIGN PATENT DOCUMENTS

| | | |
|---|---|---|
| EP | 2559545 | 2/2013 |
| EP | 2643142 | 10/2013 |
| WO | 2011042184 | 4/2011 |
| WO | 2012016951 | 2/2012 |

\* cited by examiner

APPARATUS AND PROCESS FOR ASEPTIC MOLDING OF A CONTAINER STARTING FROM A PARISON MADE OF A THERMOPLASTIC MATERIAL

TECHNICAL FIELD

The present invention relates to an apparatus and a process for aseptic molding of a container starting from parisons made of a thermoplastic material.

In particular, the invention is applicable in the sector of aseptic molding of containers made of plastic material, such as PET bottles.

BACKGROUND ART

As is known, in a stretch-blowing molding process, the parisons are heated and advanced towards a stretch-blowing apparatus having a plurality of molding stations.

Each molding station comprises a mould consisting of two half-moulds that reproduce the shape of the sides of the container to be obtained. Usually at one of the bases of the mould there is a profiling element of the bottom of the container, known in the sector as a "bottom", which engages with the half-moulds in order to define a molding cavity.

Once the parison has been inserted into the mould cavity, the two half-moulds are neared and maintained closed by a mechanical locking system.

A blower or sealing nozzle is neared to the neck of the parison and closes, and maintains airtight, the mouth thereof. Pressurised air is blown through the nozzle inside the parison.

In particular, during a first step, known as the pre-blowing step, air is blown at a maximum pressure of about 16 bar. A stretching rod, slidable inside the blowing nozzle, is simultaneously and gradually introduced into the parison until it reaches the bottom. After touching the bottom, the stretching rod continues its linear stroke during which the tubular body of the parison is stretched up to when the parison reaches substantially the desired length of the container to be obtained.

In a second step, known as the blowing step, the air is blown at a maximum pressure of about 40 bar, thus determining the expansion of the parison up until it adheres to the internal walls of the half-moulds and the bottom. Simultaneously, the stretching rod starts to retract until it exits from the container. On conclusion, the blowing air is maintained for a few instants inside the container so as to consolidate the molding of the container.

The air is then discharged through the blower nozzle so as to return the inside of the container to atmospheric pressure, and then the container is removed from the mould.

During the pre-blowing and blowing steps, the two half-moulds are stressed by very high pressures which can cause deformations in the mould and be converted into evident defects in the shape of the finished containers, where the seam line generated by the two flanked half-moulds is perceptible both to the eye and to the touch. The simple mould locking system is not sufficient to compensate for these deformations.

For this reason compensation systems for the mould mechanical deformations have been developed which, at least during the blowing step, apply a closing force on one of the two half-moulds as a function of the blowing pressure.

The closing force is applied by introducing a fluid under pressure (for example compressed air) in a confined chamber between one or the two half-moulds and the relative mechanical support (for example the mould-holder).

Document EP2559545 describes a compensation system of the deformations of the mould in which the force exerted on the half-mould by the pressurised fluid has at least two components lying in different directions. The pressurised fluid is also sterile.

However, the introduction of sterile air is not sufficient to ensure the degree of aseptic conditions required by the process.

Document WO 2012/016951 describes a compensation system in which the force is distributed on at least two different zones of one of the two half-moulds.

In an aseptic molding process all devices destined to enter into contact with the parison or which are in proximity of the parison after sterilisation thereof must be sterilisable.

The Applicant has developed a molding apparatus in aseptic conditions, in which the molding rotary carousel is protected by an isolation device suitable for defining a controlled-contamination environment, while the movement means for moving the carousel and moulds are located outside the isolation device (see European patent EP2246176).

In this apparatus, the sterilisation step involves, in particular, the gripping members, the stretching rod and the blowing air management circuit.

For this reason the Applicant has also proposed a blowing air circuit in which the air discharge pathway is split. By appropriately driving the valves of the circuit, inlet of the contaminants into the container is prevented during the evacuation of the air at high pressures (up to 40 bar) and completion of the evacuation is enabled even at low pressures (for example lower than 3 bar). This solution is described in document EP2643142.

DISCLOSURE OF THE INVENTION

In this context, the technical task underpinning the present invention is to provide an aseptic apparatus and process for molding containers starting from parisons made of a thermoplastic material, which obviate the drawbacks of the prior art as described in the foregoing.

In particular, an aim of the present invention is to provide an aseptic apparatus and process for molding containers starting from parisons made of a thermoplastic material, which enable obtaining containers having a seam line that is substantially not perceptible, i.e. containers of a higher quality, guaranteeing at the same time a degree of sterilisation compatible with aseptic technology.

The defined technical task and the specified aims are substantially achieved by an aseptic molding apparatus for molding containers starting from parisons made of a thermoplastic material, comprising:

a controlled-contamination environment;
at least a mould located in said controlled-contamination environment, said mould comprising a first half-mould and a second half-mould that can be brought together to define at least a housing cavity for housing a parison, a first support to which said first half-mould is solidly constrained, a second support to which said second half-mould is solidly constrained and at least a compensating chamber to compensate the mechanical deformations of said forming mould;
a first circuit configured to blow a first fluid into the parison;
a second circuit configured to supply the compensating chamber with the first fluid, characterised in that said compensating chamber has at least an inlet and at least an outlet, and in that said second circuit is configured to supply the compensating chamber also with a second fluid, different from the first fluid, and in that said second circuit comprises:
- a first aseptic valve configured to establish a selective communication between a first supply line of the first fluid or the second fluid and the inlet of said compensating chamber;
- a second aseptic valve configured to establish a selective communication between the outlet of said compensating chamber and a first discharge line.

The first discharge line is preferably in fluid communication with the controlled-contamination environment.

The second circuit preferably comprises driving means operatively active on the first and second aseptic valve to allow introduction of the first fluid into the compensating chamber from the first supply line through the first aseptic valve and said inlet of the compensating chamber until the molding apparatus is in a blowing configuration, and to allow circulation of the second fluid coming from the first supply line through said first aseptic valve, said inlet, said compensating chamber, said outlet, said second aseptic valve and said first discharge line until the molding apparatus is in a sterilisation configuration.

According to an embodiment, the compensating chamber has a plurality of inlets and outlets for the first fluid and/or the second fluid.

According to an embodiment, the compensating chamber is afforded between the first support and the first half-mould.

In particular, the first support is crossed by a first through-channel leading to the inlet of the compensating chamber and a second through-channel leading to the outlet of the compensating chamber. The through-channels are distinct and distanced from one another.

According to an embodiment, the mould comprises an arm that is rotatable about a hinge axis, said first support being solidly constrained to said arm and said compensating chamber being afforded between said first support and said arm.

The first fluid is preferably a gaseous medium having a pressure of 15-20 bar or 30-45 bar and said second fluid contains a sterilising agent.

The first circuit preferably comprises:
- a third aseptic valve configured to establish a selective communication between a pre-blowing line and the inside of the parison;
- a fourth aseptic valve configured to establish a selective communication between a blowing line and the inside of the parison.

The apparatus further and preferably comprises a third discharge circuit of the first fluid from the parison or from the molded container, comprising:
- a fifth valve configured to establish a selective communication between the inside of the parison or of the molded container and a second discharge line external of said controlled-contamination environment;
- a sixth aseptic valve configured to establish a selective communication between the inside of the parison or of the molded container and said controlled-contamination environment.

The third circuit further and preferably comprises a seventh valve and a non-return valve which are arranged, respectively, along a first pathway which goes from said fifth valve towards the second discharge line, and along a second pathway which goes from said fifth valve towards a recovery circuit.

The specific technical task and the specified aims are substantially attained by an aseptic molding process of a container starting from a parison made of a thermoplastic material, comprising steps of:
- arranging the parison in a housing cavity of a mould located in a controlled-contamination environment, said mould comprising a first half-mould and a second half-mould that can be brought together to define said housing cavity, a first support to which said first half-mould is solidly constrained, a second support to which said second half-mould is solidly constrained and at least a compensating chamber to compensate the mechanical deformations of said mould;
- blowing a first fluid into the parison;
- introducing the first fluid in the compensating chamber through an inlet fashioned therein;
- evacuating the first fluid from the molded container;
- evacuating the first fluid from the compensating chamber through an outlet fashioned therein;
- sterilising the compensating chamber by supplying to said inlet a second fluid containing a sterilising agent and evacuating said second fluid from the outlet of the compensating chamber.

The step of introducing the first fluid into the compensating chamber is preferably carried out by opening a first aseptic valve which places a first supply line of the first fluid in fluid communication with said inlet and closing a second aseptic valve located downstream of said outlet.

The step of evacuating the first fluid from the compensating chamber is preferably carried out by closing the first aseptic valve and opening the second aseptic valve which places said outlet in communication with a first discharge line.

The step of sterilising the compensating chamber is preferably carried out by opening said first aseptic valve and the second aseptic valve and feeding said first supply line with the second fluid.

According to an embodiment, the step of introducing the first fluid into the compensating chamber at least partly overlaps the step of blowing the first fluid into the parison or takes place prior to the step of blowing the first fluid into the parison.

According to an embodiment, the step of blowing the first fluid into the parison comprises a step of pre-blowing wherein the first fluid is blown into the parison at a pressure of 15-20 bar and a step of blowing wherein the first fluid is blown into the parison at a pressure of 30-45 bar, said step of introducing the first fluid into the compensating chamber taking place simultaneously to said step of pre-blowing.

BRIEF DESCRIPTION OF DRAWINGS

Further characteristics and advantages of the present invention will more fully emerge from the non-limiting description of a preferred but not exclusive embodiment of an aseptic molding apparatus and a process for molding containers starting from parisons made of a thermoplastic material, as illustrated in the accompanying drawings in which.

DETAILED DESCRIPTION OF PREFERRED EMBODIMENTS OF THE INVENTION

Figure 1:
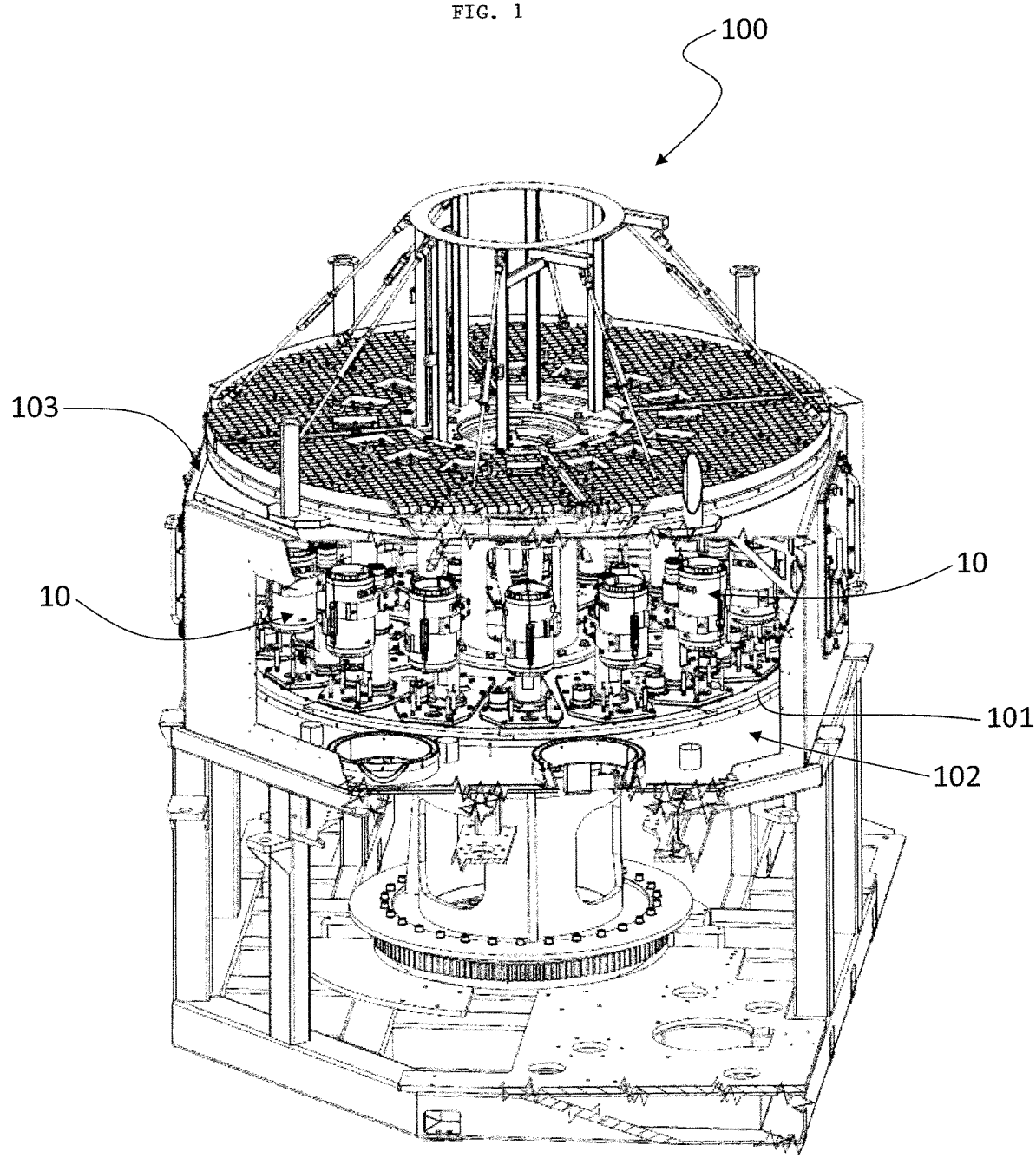
FIG. 1 illustrates an aseptic molding apparatus of containers starting from parisons made of a thermoplastic material according to the present invention, in a broken view.

With reference to the figures, the number 100 indicates an aseptic molding apparatus for containers starting from parisons made of thermoplastic material.

For example, the aseptic molding apparatus 100 comprises a rotating carousel 101, on which a plurality of moulds 10 is arranged. The rotating carousel 101 is situated inside a controlled-contamination environment 102 protected by an insulating device 103. The movement means of the rotating carousel 101 and the moulds 10 are situated outside the insulating device 103, i.e. in a non-sterile environment.

Each mould 10 comprises a first half-mould 11a and a second half-mould 11b that can be brought together to define at least a housing cavity 12 for housing a parison 20.

The mould 10 further comprises a first support 13a to which said first half-mould 11a is integrally constrained and a second support 13b to which said second half-mould 11b is integrally constrained.

Figure 2:
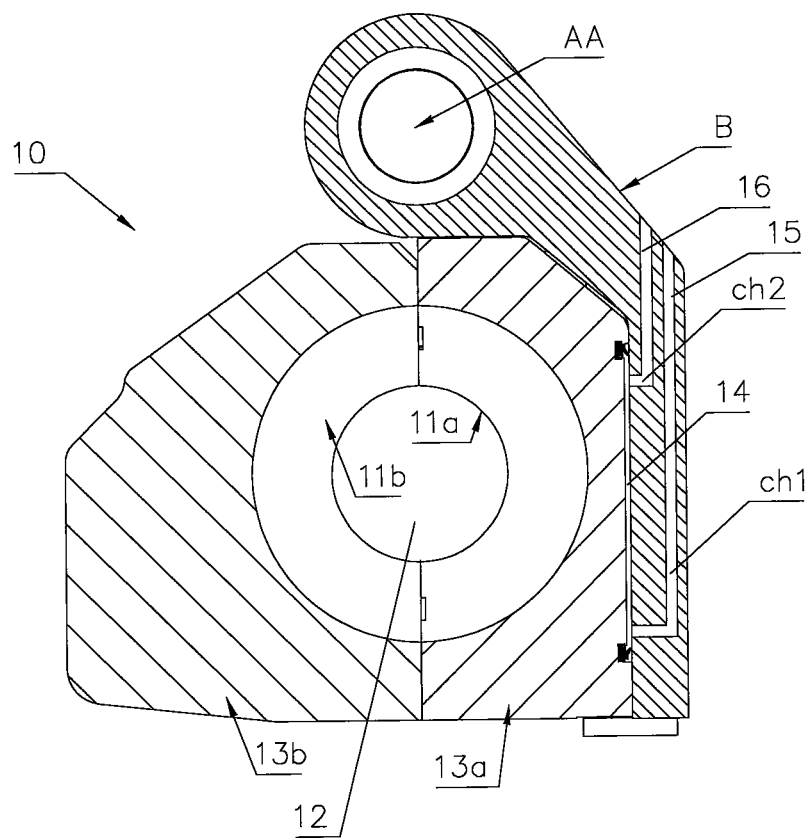
FIG. 2 illustrates a mould of the aseptic molding apparatus of FIG. 1, in cross-section.

The mould 10 preferably has a fixed support and another movable support. For example, FIG. 2 illustrates a mould 10 which also comprises an arm B rotatable about a hinge axis AA. The movable support in this case is 13a which, being integrally constrained to the arm B, rotates therewith, while the fixed support is 13b.

Alternatively, both supports 13a, 13b (and the relative half-moulds 11a, 11b, integrally constrained thereto) can rotate about a common hinge axis so that the mould 10 is of the "book" type.

In a further variant, the mould 10 is of the "linear" type, i.e. the supports (and the relative half-moulds, integrally constrained thereto) are mutually neared and distanced by translation.

The mould 10 preferably comprises a bottom (not illustrated) which cooperates with the half-moulds 11a, 11 b in order to mold the bottom of the container.

According to an embodiment, at least a compensating chamber 14 is afforded between the first support 13a and the first half-mould 11a.

Figure 4:
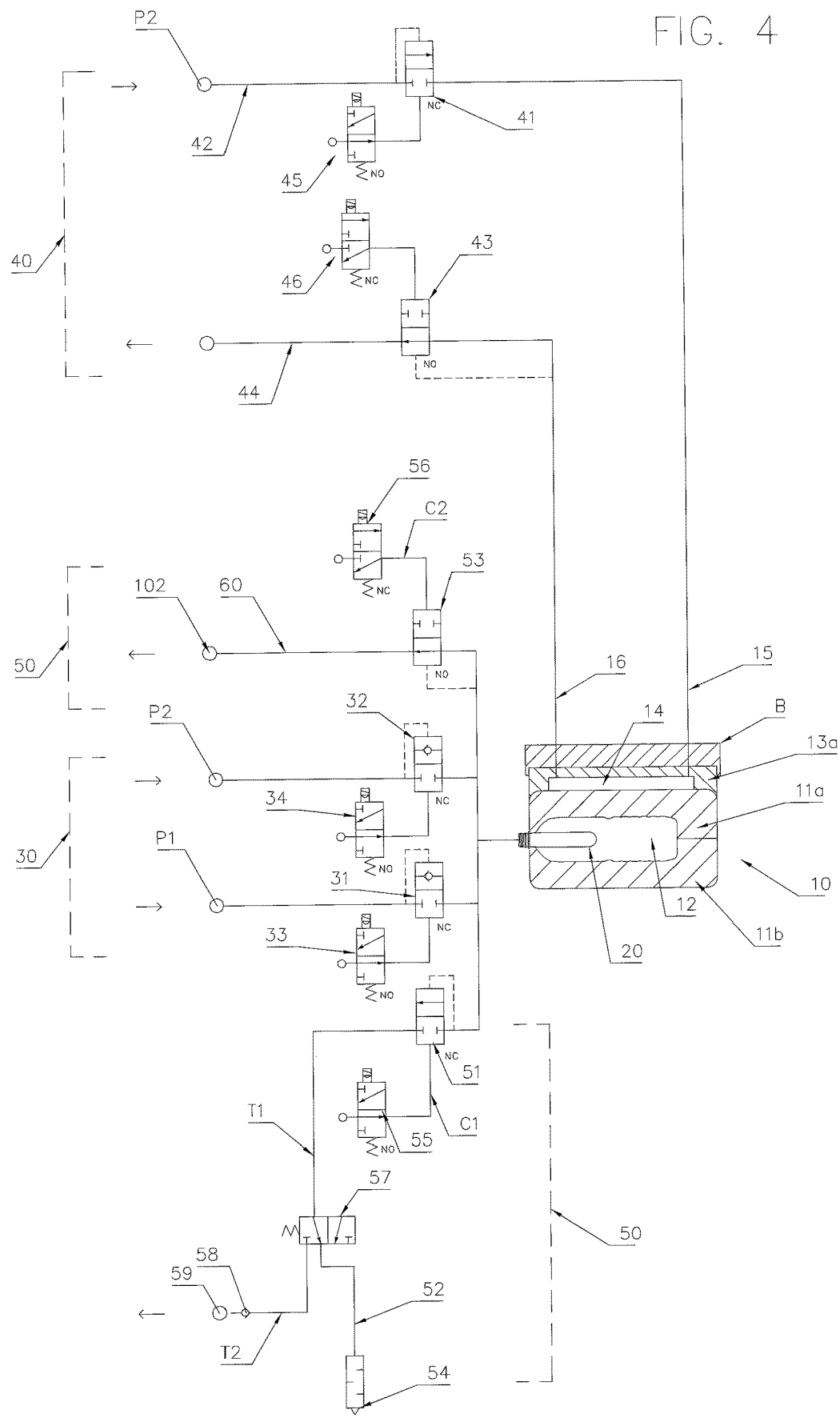
Figure 5:
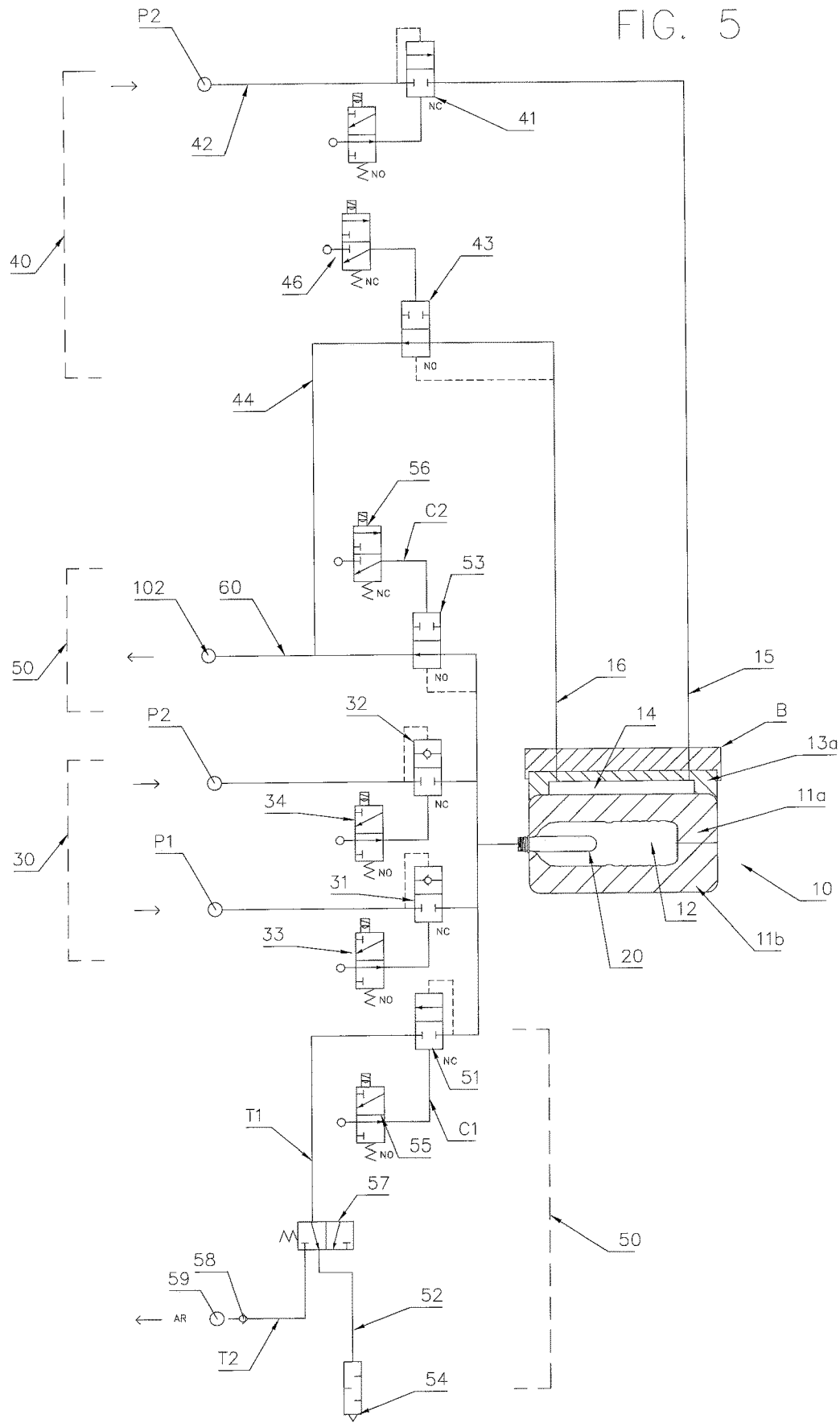

This embodiment is schematically illustrated together with the circuit diagrams of FIGS. 4-5.

The compensating chamber 14 advantageously has at least an inlet 15 and at least an outlet 16.

The first support 13a is preferably crossed by a first through-channel leading to the inlet 15 of the compensating chamber 14 and a second through-channel leading to the outlet 16 of the compensating chamber 14.

The two through-channels are distinct and distanced from one another. In an embodiment, illustrated in FIG. 2, the compensating chamber 14 is afforded between the first support 13a (movable) and the arm B.

In this case too, the compensating chamber 14 has at least an inlet 15 and at least an outlet 16.

The arm B is preferably crossed by a first through-channel ch1 that places the inlet 15 and the compensating chamber 14 in communication, and a second through-channel ch2 placing the outlet 16 and the compensating chamber 14 in fluid communication. The two through-channels ch1, ch2 are distinct and distanced from one another.

The apparatus 100 comprises a first circuit 30 configured for blowing a first fluid into the parison 20 and a second circuit 40 configured to supply the compensating chamber 14 with a first fluid or with a second fluid.

In particular, the first fluid is preferably a gaseous medium (for example air or sterile air) having a pressure of 15-20 bar or 30-45 bar.

The second fluid contains a sterilising agent.

For example, the second fluid contains hydrogen peroxide.

Originally, the second circuit 40 comprises:
 a first aseptic valve 41 configured for establishing a selective communication between a first supply line 42 of the first fluid or the second fluid and the inlet 15 of said compensating chamber 14;
 a second aseptic valve 43 configured to establish a selective communication between the outlet 16 of said compensating chamber 14 and a first discharge line 44.

The first discharge line 44 is preferably in fluid communication with said controlled-contamination environment 102.

The first and the second aseptic valve 41, 43 are commanded by driving means 45, 46 which are configured in such a way that:
 the first supply line 42 supplies the compensating chamber 14 with the first fluid, which passes through the first aseptic valve 41 and the inlet 15 of the compensating chamber 14 until the molding apparatus 100 is in a blowing configuration;
 the first supply line 42 supplies the second fluid which follows a pathway passing through the first aseptic valve 41, the inlet 15, the compensating chamber 14, the outlet 16, the second aseptic valve 43 and the first discharge line 44 until the molding apparatus 100 is in a sterilisation configuration.

The driving means 45, 46 preferably comprise a first driving valve 45 configured to command the first aseptic valve 41 and a second driving valve 46 configured to command the second aseptic valve 43.

For example, the driving valves 45, 46 consist of two-way two-position valves of known type.

The first circuit 30 comprises:
 a third aseptic valve 31 configured to establish a selective communication between a pre-blowing line P1 and the inside of the parison 20;
 a fourth aseptic valve 32 configured to establish a selective communication between a blowing line P2 and the inside of the parison 20.

In particular, the pre-blowing line P1 supplies the first fluid having a pressure comprised between 15 bar and 20 bar and the blowing line P2 supplies the first fluid having a pressure comprised between 30 bar and 45 bar. Two further driving valves 33, 34 are included (denoted as the third and fourth driving valves) and are configured to respectively command the third aseptic valve 31 and the fourth aseptic valve 32.

For example, the third and fourth driving valves 33, 34 consist of two-way two-position valves of known type.

Figure 3:
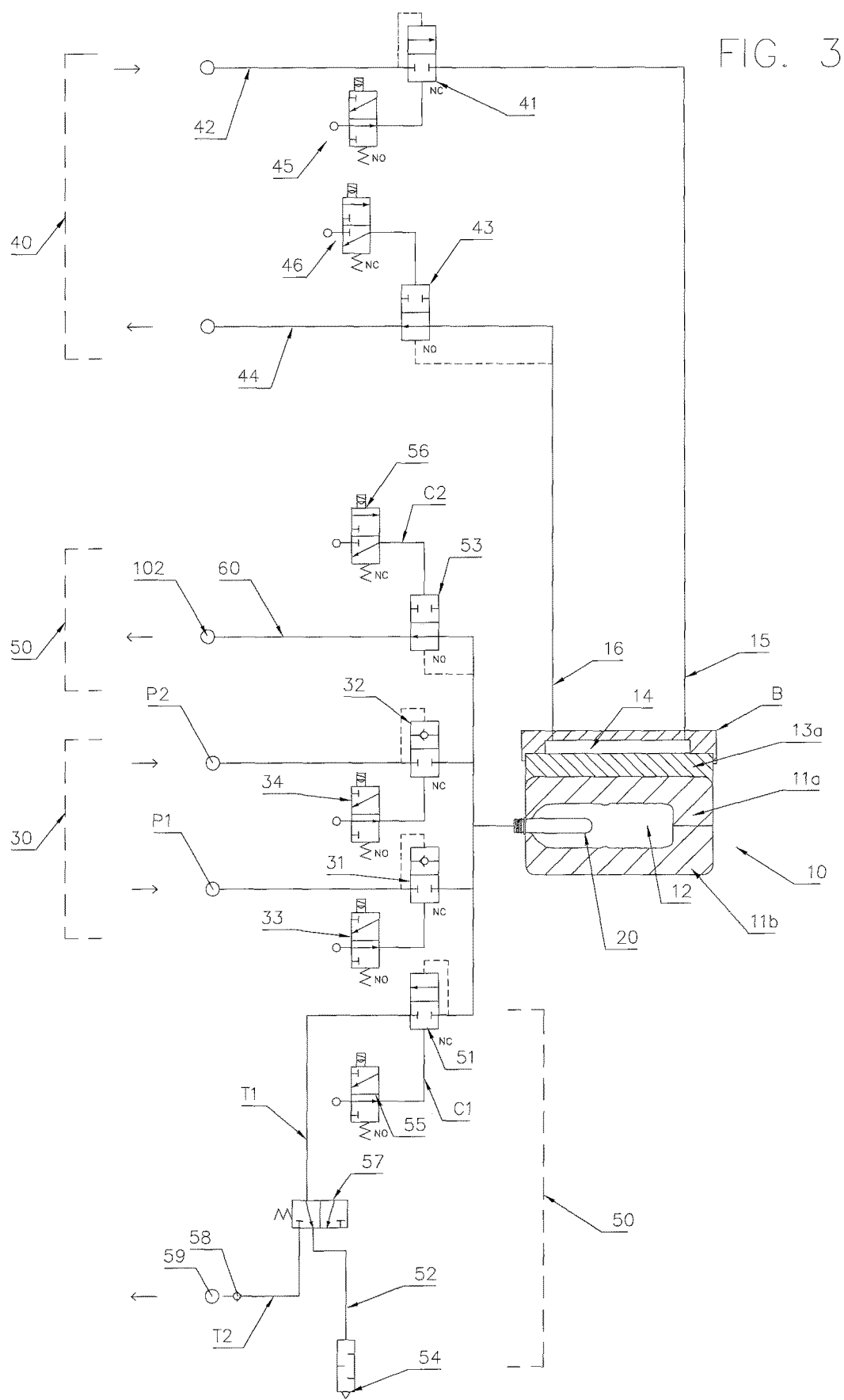
FIGS. 3, 4 and 5 illustrate the pneumatic circuit diagram for supply and discharge of the first fluid and the second fluid of the apparatus of FIG. 1, according to three different embodiments.

In a first embodiment, illustrated in FIG. 3, the first supply line 42 is separate with respect to the supply lines of pre-blowing fluid and blowing fluid P1, P2.

FIG. 4 illustrates a second embodiment which, with respect to FIG. 3, differs only in the different positioning of the compensating chamber 14. According to a variant, not illustrated, the first supply line 42 is in fluid communication with the blowing line P2.

The discharge of the first fluid from the parison 20 or container molded takes place via a third circuit 50, comprising:
- a fifth valve 51 configured to establish a selective communication between the inside of the parison 20 or of the moulded container and a second discharge line 52 external of said controlled-contamination environment 102;
- a sixth aseptic valve 53 configured to establish a selective communication between the inside of the parison 20 or of the moulded container and said controlled-contamination environment 102.

In particular, the sixth aseptic valve 53 is configured to establish a selective communication between an inside of the parison 20 or of the molded container and a third discharge line 60 is in fluid communication with said controlled-contamination environment 102.

The third discharge line 60 is preferably independent of the first discharge line 44 so as to avoid the risk of any counter-pressures in a case of contemporaneous release of the fluid from inside the parison/container and from the compensating chamber 14 (see FIGS. 3 and 4).

According to a third embodiment, illustrated in FIG. 5, the third discharge line and the first discharge line 44 are connected.

A silencer 54 is linked to the second discharge line 52 and damps the shock wave created by the pressurised fluid. In particular, the silencer 54 is located in a non-sterile zone.

The fifth valve 51 and the sixth aseptic valve 53 are commanded respectively by a fifth driving valve 55 and a sixth driving valve 56, which are configured in such a way that the opening of the fifth valve 51 and the closing of the sixth aseptic valve 53 take place in an alternating order. In this way, the first fluid discharges through one or other of the valves 51, 53.

In particular, the fifth valve 51 is normally closed and receives, during a first discharge step, an opening C1 command from the fifth driving valve 55 in response to a detecting of a pressure of the first fluid in the parison 20 or in the molded container greater than a predetermined value.

Instead, the sixth aseptic valve 53 is normally open and receives a closing C2 command from the sixth driving valve 56 in response to a detecting of a pressure of the first fluid in the parison 20 or in the molded container lower than a predetermined value.

The predetermined value is preferably comprised between 0.5 bar and 3 bar.

In particular, the fifth and sixth driving valves 55, 56 consist of two-way two-position valves of known type.

The third circuit 50 preferably further comprises a seventh valve 57 and a non-return valve 58 which are arranged, respectively, along a first pathway T1 which goes from said fifth valve 51 towards the second discharge line 52, and along a second pathway T2 which goes from said fifth valve 51 towards a recovery circuit 59. The fluid recovered in this way can be used for example for the pre-blowing.

All the driving valves 45, 46, 33, 34, 55, 56 are supplied by a dedicated supply line (not illustrated), preferably with pressurised air at about 6 bar. Each of the mentioned valves 41, 43, 31, 32, 51, 53 is a valve provided with a separation organ between the relative supply line and the command or driving line. Preferably, each aseptic valve is a diaphragm valve. For example, a valve of the type indicated in FIG. 4 of document WO2011/042184 might be used.

According to an embodiment, not illustrated, the compensating chamber has a plurality of inlets and a plurality of outlets, respectively configured to supply and evacuate the first fluid or the second fluid through a same number of pathways alike those described for the basic case (one inlet and one outlet).

In an embodiment that is not illustrated, a plurality of compensating chambers afforded between the first support 13a and the first half-mould 11a are provided (or between the first support 13a and the arm B), each of which has at least one inlet and at least one outlet. For example, the first fluid can be sent into each compensating chamber, respectively, at different pressures in order to compensate for deformations during the pre-blowing or blowing step.

The second circuit 40 can be advantageously connected to a sterilisation circuit (not illustrated) of the other parts of the mould 10.

The aseptic molding process of a container starting from a parison made of a thermoplastic material, according to the present invention, is described in the following, with particular reference to FIGS. 4-5.

The first fluid, at an average pressure, i.e. between 15 bar and 20 bar, is initially injected inside the parison 20, positioned in the corresponding mould 10. This step, termed pre-blowing, is carried out by opening the third aseptic valve 31, which places the inside of the parison 20 in fluid communication with the pre-blowing line P1.

The fourth aseptic valve 32 is instead maintained closed.

The actual blowing step then takes place, during which the first fluid is injected into the parison 20 at high pressure, i.e. between 30 bar and 45 bar. This is achieved by opening the third aseptic valve 31 and opening the fourth aseptic valve 32 in such a way that the parison 20 is placed in fluid communication with the blowing line P2.

During the blowing step, the first aseptic valve 41 is opened and places the first supply line 42 in fluid communication with the compensating chamber 14.

The supply line 42 can receive the first fluid independently of the blowing line P2 (see for example FIG. 4) or directly therefrom and, via the first aseptic valve 41 (open), the first fluid reaches the compensating chamber 14 passing through the first inlet 15.

The second aseptic valve 43 is maintained closed so that the first fluid remains confined in the compensating chamber 14 and in such a way that it presses on the first half-mould 11a and nears the first half-mould 11a to the second half-mould 11b. In this way, a compensation takes place of the pressure exerted by the first fluid inside the parison 20.

The step of introducing the first fluid into the compensating chamber 14 preferably takes place at least partly already during the step of pre-blowing. In a variant embodiment, the step of introducing the first fluid into the compensating chamber 14 takes place before the step of pre-blowing. On termination of the blowing step, the container is molded. It is then necessary to evacuate the first fluid both from the compensating chamber 14 and from the container.

The evacuation of the first fluid from the compensating chamber 14 is carried out by closing said first aseptic valve 41 and opening the second aseptic valve 43. In this way, the first fluid passes through the outlet 16 of the compensating chamber 14 and the second aseptic valve 43 and reaches the first discharge line 44, which preferably discharges the fluid in to the controlled-contamination environment 102.

As regards the evacuation of the first fluid from the molded container, two discharge steps are preferably included.

In a first discharge step, the first fluid is evacuated towards the outside of the controlled-contamination environment 102 until the pressure of the fluid inside the container reaches the predetermined value. This step is carried out by opening the fifth valve 51 which places the inside of the container in fluid communication with the second discharge line 52, and maintaining the sixth aseptic valve 53 closed.

In a second discharge step, the first fluid is evacuated towards the controlled-contamination environment 102.

This step is carried out by closing the fifth valve 51 and opening the sixth aseptic valve 53.

It should be noted that during the steps of pre-blowing and blowing the sixth aseptic valve 53 is preferably maintained closed so as not to compromise the balance of pressures inside the controlled-contamination environment 102.

As long as the pressure of the first fluid is greater than the prefixed value, the fifth valve 51 is open so as to enable discharge of the first fluid from inside the parison 20 or the container towards the second discharge line 52. The sixth valve 53, in the meantime, is maintained closed. In practice, the first fluid at maximum pressure (generally about 40 bar) is discharged through the fifth valve 51 down to a prefixed value (0.5 bar-3 bar) towards the outside of the controlled-contamination environment 102.

When the pressure has fallen below the prefixed value, the fifth valve 51 returns into the closed condition. Note that the closing of the fifth valve 51 takes place while the fluid flow goes from inside the container towards the second discharge line 52. In practice, when the fifth valve 51 is open there is always a fluid flow which goes from inside the container towards the outside so as to exclude the possibility that any contaminants present in the third circuit 50 (for example in the silencer 9) can migrate towards the inside, i.e. towards the controlled-contamination environment 102.

The third discharge line 60 is preferably independent of the first discharge line 44 so as to avoid the risk of any counter-pressures in a case of contemporaneous release of the fluid from inside the parison/container and from the compensating chamber 14 (see FIG. 4).

The sixth valve 53, instead, is opened at the same time as the closing of the fifth valve 51 so that the fluid can complete the discharge from inside the container, which is sterile, towards the controlled-contamination environment 102. In practice, the first fluid is discharged through the sixth valve 53 from the prefixed value up until it reaches a pressure balance with the controlled-contamination environment 102.

The compensating chamber 14 is further subject to at least a sterilisation step, carried out prior to the molding or with a periodic cadence.

This sterilisation step is done by circulating the second fluid in arrival from the first supply line 42, through the first aseptic valve 41 and the second aseptic valve 43, both maintained open.

In this way, the second fluid enters the compensating chamber 14 through the inlet 15 and is evacuated through the outlet 16, to reach the first discharge line 44.

The discharge line 44 preferably leads to the controlled-contamination environment 102.

From the above description the characteristics of the apparatus and process for aseptic molding of containers starting from parisons made of a thermoplastic material, according to the present invention, will be clear, as will the resultant advantages thereof.

In particular, owing to the fact that the compensating chamber has at least an inlet and at least an outlet, it is possible to use the same circuit both for the introduction and evacuation of the blowing fluid (with the function of compensating the mechanical deformations), and for the circulation of the sterilising fluid (with the function of sterilising the compensating chamber). In this way, not only the compensating chamber can be sterilised priorly or periodically, but so can the circuit leading to it (valves, channels, etc.).

The invention claimed is:

1. Aseptic molding apparatus (100) for molding containers starting from parisons made of a thermoplastic material, comprising:
    a controlled-contamination environment (102);
    at least a mould (10) located in said controlled-contamination environment (102), said mould (10) comprising a first half-mould (11*a*) and a second half-mould (11*b*) that can be brought together to define at least a housing cavity (12) for housing a parison (20), a first support (13*a*) to which said first half-mould (11*a*) is integrally constrained, a second support (13*b*) to which said second half-mould (11*b*) is integrally constrained and at least a compensating chamber (14) for compensating the mechanical deformations of said mould (10);
    a first circuit (30) configured to blow a first fluid into the parison (20);
    a second circuit (40) configured to supply the compensating chamber (14) with the first fluid,
    characterised in that said compensating chamber (14) has at least an inlet (15) and at least an outlet (16), and in that said second circuit (40) is configured to supply the compensating chamber (14) also with a second fluid, different from the first fluid, and in that said second circuit (40) comprises:
    a first aseptic valve (41) configured to establish a selective communication between a first supply line (42) and the inlet (15) of said compensating chamber (14), said first supply line (42) being a supply line for the first fluid and also being a supply line for the second fluid;
    a second aseptic valve (43) configured to establish a selective communication between the outlet (16) of said compensating chamber (14) and a first discharge line (44).

2. Aseptic molding apparatus (100) according to claim 1, wherein said first discharge line (44) is in fluid communication with said controlled-contamination environment (102).

3. Aseptic molding apparatus (100) according to claim 1, wherein said second circuit (40) further comprises driving means (45, 46) operatively active on said first and said second aseptic valve (41, 43) for allowing introduction of the first fluid into the compensating chamber (14) from the first supply line (42) through the first aseptic valve (41) and said inlet (15) of the compensating chamber (14) until the molding apparatus (100) is in a blowing configuration, and for allowing circulation of the second fluid coming from the first supply line (42) through said first aseptic valve (41), said inlet (15), said compensating chamber (14), said outlet (16), said second aseptic valve (43) and said first discharge line (44) until the molding apparatus (100) is in a sterilising configuration.

4. Aseptic molding apparatus (100) according to claim 1, wherein said compensating chamber (14) has a plurality of inlets and outlets for the first fluid and/or the second fluid.

5. Aseptic molding apparatus (100) according to claim 1, wherein said compensating chamber (14) is obtained between said first support (13*a*) and said first half-mould (11*a*).

6. Aseptic molding apparatus (100) according to claim 5, wherein said first support (13*a*) is crossed by a first through-channel leading to the inlet (15) of the compensating chamber (14) and a second through-channel leading to the outlet (16) of the compensating chamber (14), said through-channels being distinct and distanced from one another.

7. Aseptic molding apparatus (100) according to claim 1, wherein said mould (10) comprises an arm (B) that is rotatable about a hinge axis (AA), said first support (13a) being integrally constrained to said arm (B) and said compensating chamber (14) being obtained between said first support (13a) and said arm (B).

8. Aseptic molding apparatus (100) according to claim 1, wherein said first fluid is a gaseous medium having a pressure of 15-20 bar or 30-45 bar and said second fluid contains a sterilising agent.

9. Aseptic molding apparatus (100) according to claim 1, wherein said first circuit (30) comprises:
- a third aseptic valve (31) configured to establish a selective communication between a pre-blowing line (P1) and the inside of the parison (20);
- a fourth aseptic valve (32) configured to establish a selective communication between a blowing line (P1) and the inside of the parison (20).

10. Aseptic molding apparatus (100) according to claim 1, further comprising a third discharge circuit (50) of the first fluid from the parison (20) or from the molded container, comprising:
- a fifth valve (51) configured to establish a selective communication between the inside of the parison (20) or of the molded container and a second discharge line (52) external of said controlled-contamination environment (102);
- a sixth aseptic valve (53) configured to establish a selective communication between the inside of the parison (20) or of the molded container and said controlled-contamination environment (102).

11. Aseptic molding apparatus (100) according to claim 10, wherein said third circuit (50) further comprises a seventh valve (57) and a non-return valve (58) which are arranged, respectively, along a first pathway (T1) which goes from said fifth valve (51) towards the second discharge line (52), and along a second pathway (T2) which goes from said fifth valve (51) towards a recovery circuit (59).

12. Process for aseptic molding of a container starting from a parison (20) made of a thermoplastic material, comprising the steps of:
- arranging the parison (20) in a housing cavity (12) of a mould (10) located in a controlled-contamination environment (102), said mould (10) comprising a first half-mould (11a) and a second half-mould (11b) that can be brought together to define said housing cavity (12), a first support (13a) to which said first half-mould (11a) is intergrally constrained, a second support (13b) to which said second half-mould (11b) is integrally constrained and at least a compensating chamber (14) for compensating the mechanical deformations of said mould (10);
- blowing a first fluid into the parison (20);
- introducing the first fluid in the compensating chamber (14) through an inlet (15) obtained therein;
- evacuating the first fluid from the molded container;
- evacuating the first fluid from the compensating chamber (14) through an outlet (16) obtained therein;
- sterilising the compensating chamber (14) by supplying to said inlet (15) a second fluid containing a sterilising agent and evacuating said second fluid from the outlet (16) of the compensating chamber (14).

13. Process for aseptic molding according to claim 12, wherein the step of introducing the first fluid into the compensating chamber (14) is carried out by opening a first aseptic valve (41) which places a first supply line (42) of the first fluid in fluid communication with said inlet (15) and closing a second aseptic valve (43) located downstream of said outlet (16).

14. Process for aseptic molding according to claim 13, wherein the step of evacuating the first fluid from the compensating chamber (14) is carried out by closing said first aseptic valve (41) and opening said second aseptic valve (43) which places said outlet (16) in communication with a first discharge line (44).

15. Process for aseptic molding according to claim 14, wherein the step of sterilising the compensating chamber (14) is carried out by opening said first aseptic valve (41) and said second aseptic valve (43) and feeding said first supply line (42) with the second fluid.

16. Process for aseptic molding according to claim 12, wherein the step of introducing the first fluid into the compensating chamber (14) at least partly overlaps the step of blowing the first fluid into the parison (20) or takes place prior to the step of blowing the first fluid into the parison (20).

17. Process for aseptic molding according to claim 12, wherein the step of blowing the first fluid into the parison (20) comprises a step of pre-blowing wherein the first fluid is blown into the parison (20) at a pressure of 15-20 bar and a step of blowing wherein the first fluid is blown into the parison (20) at a pressure of 30-45 bar, said step of introducing the first fluid into the compensating chamber (14) taking place simultaneously to said step of pre-blowing.

* * * * *